(12) United States Patent
De Block et al.

(10) Patent No.: US 8,196,255 B2
(45) Date of Patent: Jun. 12, 2012

(54) CONNECTION APPARATUS FOR A WIPING ARM

(75) Inventors: Peter De Block, Halen (BE); Eric Windmolders, Kermt (BE); Tom Vangeel, Leuven (BE); Hans Beelen, Herk de Stad (BE)

(73) Assignee: Robert Bosch GmbH, Stuttgart (DE)

( * ) Notice: Subject to any disclaimer, the term of this patent is extended or adjusted under 35 U.S.C. 154(b) by 819 days.

(21) Appl. No.: 12/097,601

(22) PCT Filed: Nov. 17, 2006

(86) PCT No.: PCT/EP2006/068594
§ 371 (c)(1),
(2), (4) Date: Jun. 16, 2008

(87) PCT Pub. No.: WO2007/071508
PCT Pub. Date: Jun. 28, 2007

(65) Prior Publication Data
US 2008/0263810 A1    Oct. 30, 2008

(30) Foreign Application Priority Data

Dec. 15, 2005  (DE) .................. 10 2005 060 491
May 12, 2006  (DE) .................. 10 2006 022 389

(51) Int. Cl.
*B60S 1/40* (2006.01)
(52) U.S. Cl. ............. 15/250.32; 15/250.43; 15/250.351; 15/250.201
(58) Field of Classification Search ............. 15/32, 35.1, 15/43, 44, 201, 250.32, 250.351, 250.43, 15/250.44, 250.201, 250.361
See application file for complete search history.

(56) References Cited

U.S. PATENT DOCUMENTS

| 4,300,259 | A | * | 11/1981 | Maiocco | 15/250.32 |
| 5,383,248 | A | * | 1/1995 | Ho | 15/250.32 |
| 6,588,048 | B2 | * | 7/2003 | Ohyama | 15/250.43 |
| 6,792,644 | B2 | * | 9/2004 | Roodt | 15/250.32 |
| 7,281,294 | B2 | * | 10/2007 | Wilms et al. | 15/250.351 |
| 7,690,073 | B2 | * | 4/2010 | Marmoy et al. | 15/250.32 |
| 7,690,074 | B2 | * | 4/2010 | Ostrowski | 15/250.32 |

FOREIGN PATENT DOCUMENTS

| DE | 10000374 A1 | 7/2001 |
| DE | 10230457 | 1/2004 |
| EP | 1029758 A2 | 8/2000 |
| JP | 60105552 | 7/1985 |
| JP | 4334644 | 11/1992 |
| JP | 2004217102 | 8/2004 |
| WO | 2005/002934 A1 | 7/2004 |

OTHER PUBLICATIONS

PCT/EP2006/068594 International Search Report.

* cited by examiner

*Primary Examiner* — Gary Graham
*Assistant Examiner* — Michael Jennings
(74) *Attorney, Agent, or Firm* — Michael Best & Friedrich LLP (57) ABSTRACT

The invention relates to a connection apparatus (10) for a wiper arm (14) and a wiper blade (12). The connection apparatus comprises a first and a second connection part. According to the invention, provision is made for the first connection part to have a first identification means and for the second connection part to have a second identification means which corresponds to the first identification means. The invention also comprises a system with two flat-bar wiper blades, with at least one first identification means being provided on at least one flat-bar wiper blade in order to distinguish between the two wiper blades.

20 Claims, 13 Drawing Sheets

CONNECTION APPARATUS FOR A WIPING ARM

BACKGROUND OF THE INVENTION

The invention relates to a connection device for a wiper arm and a wiper blade according to the preamble of claim 1, as well as a system consisting of two flat-bar wiper blades according to the preamble of claim 8.

A connection device for a wiper arm and a wiper blade is already known from DE-A-102 30 457, which comprises a first connection part on the wiper blade side and a second connection part on the wiper arm side, which are arranged adjacent to one another in the operating position. The second connection part comprises a hinge element so that the wiper blade is pivotably connected to the wiper arm about a hinge axis, a securing means being provided so that the two connection parts engage in one another.

Moreover, numerous connection devices for wiper arms and wiper blades are known, in which the connection part on the wiper arm side is arranged over the connection part on the wiper blade side.

It is known to provide wiper blades which are generally of different length and configured differently for the driver side and the passenger side. The problem exists that the wiper blades are frequently mixed up which may lead to an inadequate wiping pattern and partially even to damage of the motor vehicle.

SUMMARY OF THE INVENTION

The object underlying the invention is to propose a connection device for a wiper arm and a wiper blade as well as a system comprising two flat-bar wipers, by means of which the risk of mixing up different wiper blades is at least minimized.

The idea underlying the invention is to provide identification means on the connection device for a wiper arm and a wiper blade, by means of which a clear association of the wiper blades to the associated wiper arm, in particular on the passenger side and/or the driver side, is possible. The connection devices are configured such that, as a result of the identification means, at least the mounting of a wiper blade on the non-corresponding wiper arm is prevented. The shape and/or arrangement and/or number of identification means prevents a false association of the two wiper blades. Thus, for example, it is not possible to mount the wiper blade which is on the driver side on the wiper arm which is on the passenger side.

According to a preferred embodiment, the identification means of a pair of identification means is configured to be complementary in shape and/or arranged such that they engage in one another in the operating state. The identification means of the different pairs are, however, not configured to be of complementary shape to one another and/or arranged such that they may not engage in one another in the operating state.

Preferably, the securing means of the second connection part comprises a bridge with a limit stop. By means of the bridge, the securing means overlaps at least partially the first connection part. The limit stop serves to engage behind the first connection part and/or a projection of the first connection part, in order to avoid an axial displacement along the hinge axis in the assembled state. Preferably, the limit stop engages in a recess of the first connection part. In the operating position, therefore, said limit stop locks the connection device.

A simple handling is cost-effectively achieved by the first connection part being releasable from and/or able to be connected to the second connection part by a rotation of at least one of the connection parts about the hinge axis by a releasing angle. In this manner it is possible without the aid of tools or without specialist knowledge to remove the wiper blade from the wiper arm and/or to connect said wiper blade and wiper arm together, whereby the assembly is simplified, in particular even for a non-professional. It is advantageous if the limit stop has a shoulder for determining the releasing angle. Moreover, it is advantageous if the releasing angle is between 5° and 50°, in particular between 20° and 40°, preferably between 20° and 30°, ideally approximately 25°, as in this manner a more secure retention of the connection device is ensured without having to make handling difficult when changing the wiper blade. In this connection, it is particularly advantageous if a limiting stop is provided, which in particular is formed by an edge or face of the receiver which prevents a rotation beyond the releasing angle. Ideally, the longitudinal shape of the receiver is dimensioned such that when releasing and/or connecting the connection parts it is able to receive the shoulder. In a simple embodiment, advantageously, the receiver is of groove-shaped configuration and comprises in particular two lateral walls and a base, which in particular is of substantially planar configuration. As a result, the first connection part is particularly suitable for being produced in an injection-molding process. In a development of the invention, it is provided that the first connection part has a spoiler wall, which forms the entire height of the first connection part and covers a spoiler side. In this manner, a particularly streamlined exterior is achieved and moreover a particularly attractive appearance is achieved. In a particularly simple, cost-effective and attractive manner, the securing means covers the first connection part in a substantially flush manner.

In an embodiment of the invention it is provided that at least one of the two identification means of a connection device, preferably the first identification means, is configured as an opening and the other identification means, preferably the second identification means, is configured as a pin which engage in one another in the operating position. Thus the opening and/or the pin are shaped or arranged differently, where there are two different connection devices, so that only the parts matching one another may be mounted on one another. Moreover, it is conceivable to select different numbers of identification means where there are different connection devices. For example, three pins may be provided as first identification means of the wiper blade on the driver side, which correspond to three openings of the wiper arm on the driver side in arrangement and shape. If, therefore, only two openings are provided on the wiper arm on the passenger side or three openings at different relative positions to one another, the wiper blade on the driver side is not able to be mounted on the wiper arm on the passenger side and/or the associated first connection part thereof.

It is also conceivable to provide the limit stop of the securing means as well as a corresponding recess for receiving the limit stop as identification means. Thus the limit stops and/or recesses of two different connection devices may be differently formed and/or arranged in order to eliminate mixing up the wiper blades. For example, the limit stops of two different connection devices may be of different lengths and/or widths and the corresponding recesses accordingly designed with different depths and/or different widths. The variable arrangement of the limit stops of two different connection devices may, for example, be implemented by a variable bridge length.

According to the invention, the system consisting of two flat-bar wiper blades comprises a first identification means on at least one flat-bar wiper blade for differentiating the two wiper blades. In a simple embodiment, the identification means is configured as an identification logo, preferably as a symbol for the driver side and/or the passenger side. In this case, the identification logo, for example, may be arranged in a raised manner on the base of the receiver or embossed therein.

It is also possible to configure the first identification means as a pin or opening which correspond with the corresponding second identification means on the associated wiper arm. The pins and/or openings may be differentiated by number, shape or positioning.

Additionally or alternatively, the recesses may be configured for receiving the respective limit stop of the securing means of the second connection part as identification means. Said identification means may be differentiated by the size, number or positioning on the two flat-bar wiper blades. In addition, it is conceivable to use as identification means the shape of the upper face of the second connection part, for example, such that only the appropriate wiper blade may be pushed onto the second connection part in the direction of its hinge axis, in particular through a recess, and in that the inappropriate wiper blade strikes against the face of the second connection part when attempting to push the hinge parts into one another.

BRIEF DESCRIPTION OF THE DRAWINGS

Further advantages and expedient embodiments may be taken from the further claims, the description of the figures and the drawings, in which:

DETAILED DESCRIPTION

The same components and components with the same function are provided with the same reference numerals in the figures.

Figure 1:
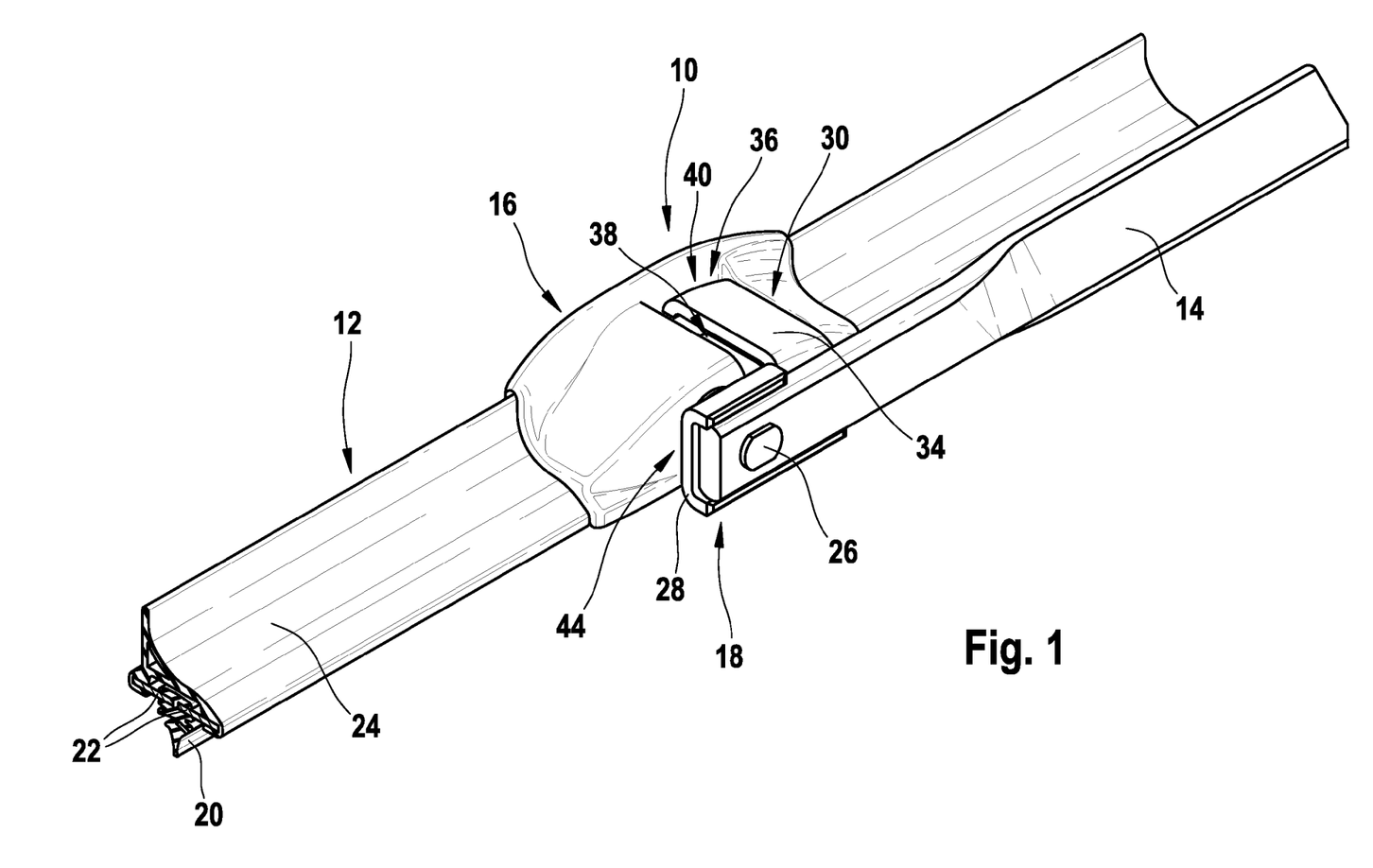
FIG. 1 shows a mounted connection device in a perspective view.

In FIG. 1 a connection device 10 is shown with a portion of a wiper blade 12 configured as a flat-bar wiper blade and a wiper arm 14. The connection device 10 shows substantially a first connection part 16 which is fastened to the wiper blade 12 as well as a second connection part 18 which is fastened to the wiper arm. The wiper blade 12 configured as flat-bar wiper blade substantially encompasses a wiper rubber 20 which is supported on a spring rail 22. For improving the flow characteristics on the side of the spring rail 22 remote from the wiper rubber 20, a spoiler 24 is fastened, in particular pushed onto the spring rail 22, which is formed from a rubber-elastic material. The first connection part 16 is fixedly connected to the spring rail 22, so that the wiper blade 12 is securely held on the first connection 16.

The wiper arm 14 bears at its free end the second connection part 18. The wiper arm 14 is thus configured in the region of its free end as a simple rod, which has a substantially rectangular cross section. The side of the rod which is longer in cross section extends perpendicular to the window. The second connection part 18 is in this embodiment configured as a bent sheet metal part and encompasses the free end of the wiper arm with a first portion 28 in the manner of a clamp. A second portion 30 of the second connection part 18 extends perpendicular from the free end of the wiper arm 14 in the direction of the first connection part 16 and overlaps said connection part in the manner of a bridge. As a result, a securing means 32 is formed which is formed by a bridge 34 of the second portion 30, which is terminated by a limit stop 36. The bridge 34 extends approximately perpendicular to the longitudinal extension of the wiper arm 14, parallel to the surface of the window or approximately parallel to the plane which is formed by the spring rail 22.

The first connection part 16 comprises a receiver 38 and a recess 40 for receiving the bridge 34, in the connected state the bridge 34 being received in the receiver 38 and the limit stop in the recess 40. The limit stop 36 is arranged approximately perpendicular to the window as well as perpendicular to the bridge 34. By means of the limit stop 36, the first connection part 16 and the second connection part 18 engage in one another.

Moreover, on the second connection part 18 a pin 26 is provided which extends in the direction of the wiper arm 14, spaced apart from the bridge 34. The longitudinal extension of the pin 26 extends perpendicular to the longitudinal extension of the wiper arm 14 and thus approximately parallel to the bridge 34. The pin 26 engages in a counter hinge element 43 which is configured as a blind hole (see FIG. 3) whereby a hinge 44 is formed. The first connection part 16 is thus connected to the second connection part 18 in a rotationally displaceable manner.

The pin 26 is thus configured such that, on the one hand, it fastens the second connection part 18 to the free end of the wiper arm 14 and at the same time is part of the hinge 44.

In the receiver 38 as well as on the bridge 34, first and second identification means, not shown, are provided which engage in one another in the operating position shown. Said first and second identification means allow a correct association of the wiper blade 12 with the corresponding wiper arm 14. A wiper blade 12 not belonging to the wiper arm 14, is not able to be mounted as the first and second identification means do not correspond to one another, either as a result of a variable number and/or a variable shape and/or variable positioning.

Figure 2:
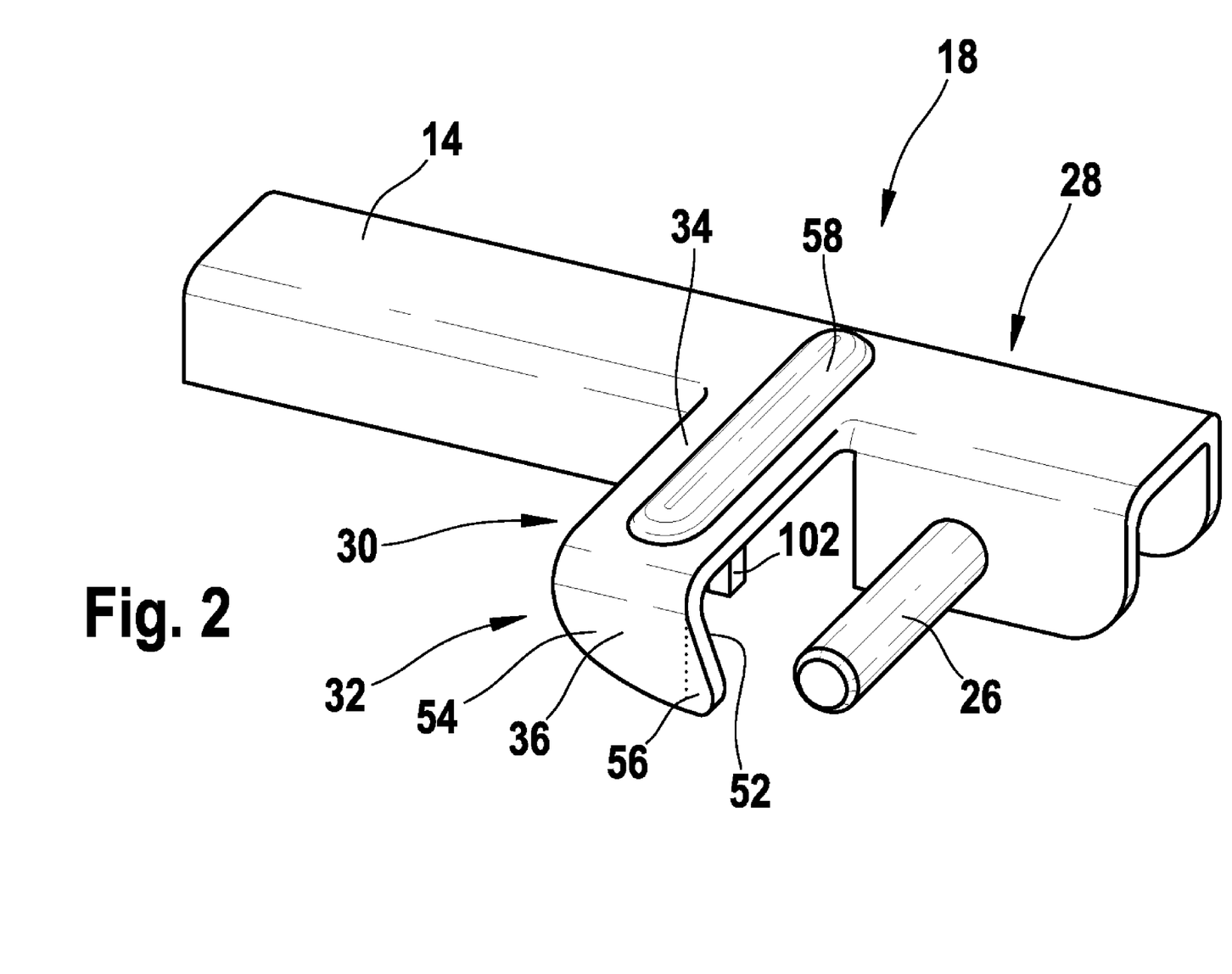
FIG. 2 shows the free end of a wiper arm with the second connection part of the connection device on the wiper arm side in a perspective view.

In FIG. 2, the second connection part 18 is shown in a variant which, however, is constructed to be functionally identical to the second connection part 18 shown in the remaining figures. Thus the same elements are also provided with the same reference numerals. The pin 26, which forms the hinge axis, is fastened to the first portion 28 of the second connection part 18. The securing means 32 formed by the bridge 34 and the limit stop 36 arranged at right angles thereto, is arranged spaced apart therefrom. The parallel lateral surfaces 52 and 54 of the limit stop 36 arranged spaced apart from one another limit the axial mobility on the hinge axis, by forming stops in the axial direction in the recess 40 of the first connection part 16.

For stabilization, the limit stop 36 comprises a shoulder 56 which enlarges the limit stop 36 in the direction of the pin 26 and thus in the direction of the hinge axis. The configuration and size of the shoulder 56 determines the releasing angle. For stabilization, a raised portion 58 is formed on the bridge 34 which increases the flexural strength of the bridge 34. Instead of the raised portion 58 which is directly bent out of the sheet metal of the bridge 34, a recess may be provided additionally or alternatively.

A second identification means 102 configured as a pin is arranged on the underside of the bridge 34. The second identification means 102 is arranged on the underside of the bridge 38 and extends substantially parallel to the limit stop 36. The second identification means 102 corresponds to a first identification means 101 configured as an opening, which is visible in FIG. 3. The first identification means 101 is arranged and formed such that it may completely accommodate the second identification means 102 in the mounted state shown in FIG. 1 in the operating position. In a further wiper arm, not shown, the first identification means is, for example, arranged at a different position of the receiver 38 and/or differently formed, so that the second identification means 102 of the wiper arm 14 does not correspond thereto, i.e. may not be introduced therein, whereby a mix-up of the wiper blades is avoided.

Figure 3:
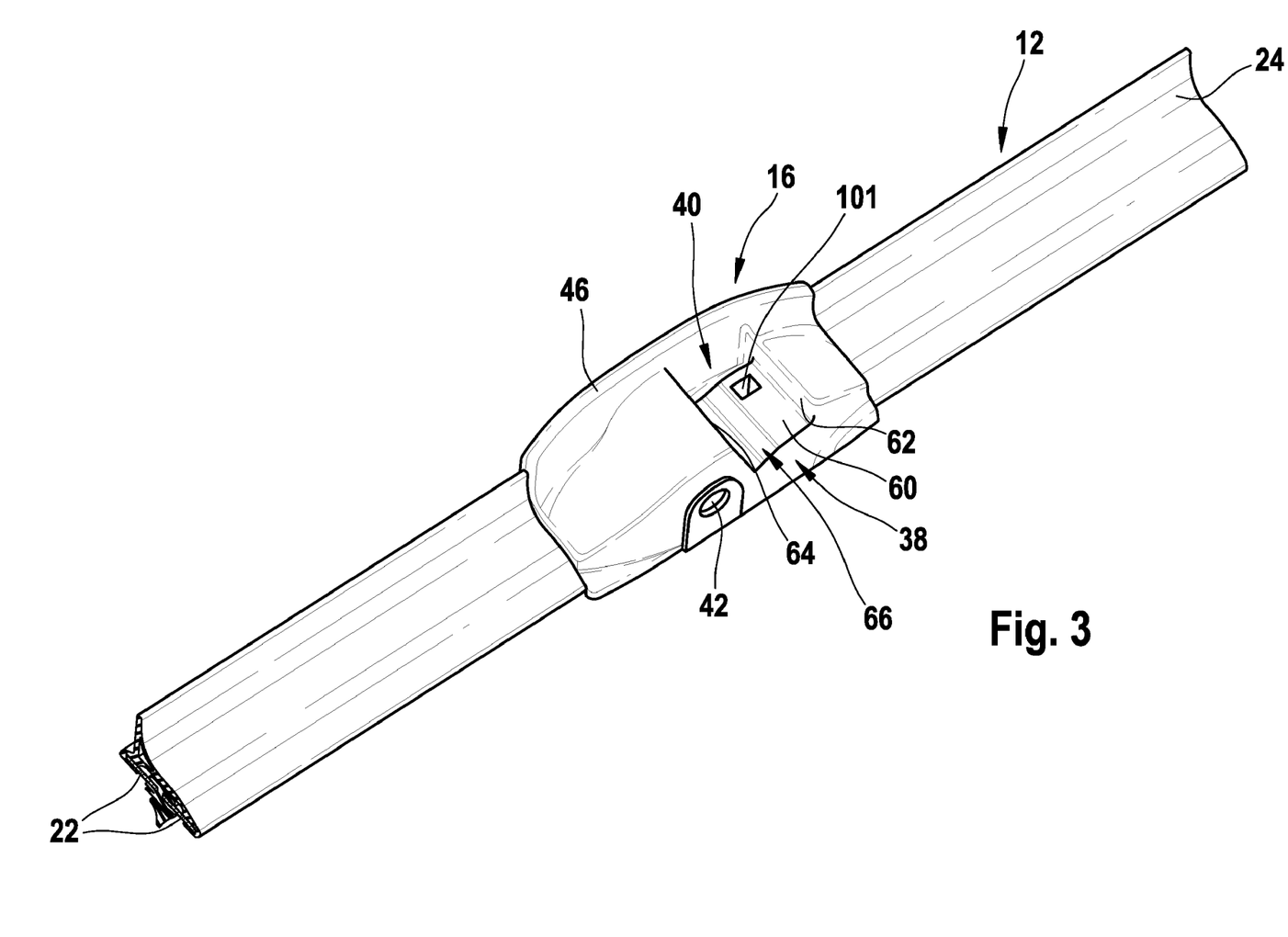
FIG. 3 shows the first connection part on the wiper blade side mounted on a flat-bar wiper blade of the connection device in perspective view.

In FIG. 3, the first connection part 16 of the connection device 10 is shown with the wiper blade 12 in a perspective view. The wiper blade 12 comprises a spoiler 24 which is fastened to the spring rail 22. In a similar manner to the spoiler 24, the first connection part 16 is also fastened to the spring rail 22. In a variation, the first connection part 16 may also be fastened to the spoiler 24. The first connection part 16 comprises an opening as a counter hinge element 42 which serves to receive the pin 26 so that, together with the pin 26, the hinge 44 (see FIG. 1) is formed. The counter hinge element 42 may, for example, be configured as a continuous hole or as a blind hole.

The receiver 38 for the bridge 34 is spaced apart from the hinge axis of the hinge 44. The receiver 38 comprises in this case a base 60 as well as a first lateral wall 62 and a second lateral wall 64 which is arranged on the side of the receiver 38 facing the hinge 44. The base 60 of the receiver 38 comprises in the region of the second lateral wall 64 a longitudinal recess 66, which extends parallel to the hinge axis and thus parallel to the counter hinge element 42. In this case, the longitudinal recess 66, in the same manner as the receiver 38, extends from the recess 40 as far as the outer limit stop of the first connection part 16, so that the shoulder 56 of the second connection part 18 may slide through the longitudinal recess 66. The recess 40 follows in its internal contour the limit stop 36 with the shoulder 56 of the second connection part 18.

The longitudinal shape 66 is thus dimensioned together with the shoulder 56 of the second connection part 18 such that the releasing angle is approximately 25°, i.e. such that by a rotation of the first connection part 16 relative to the second connection part 18 the axial blocking of the hinge 44 is increased by 25°, as the limit stop 36 in cross section is entirely located inside the receiver 38 with the longitudinal recess 66. Thus by an axial displacement on the hinge axis and/or on the pin 26 the first connection part 16 may be released from the second connection part 18.

As is visible from FIG. 3, the identification means 101 configured as an opening is incorporated in the base 60 of the receiver 38 with lateral spacing from the recess 40.

Figure 4:
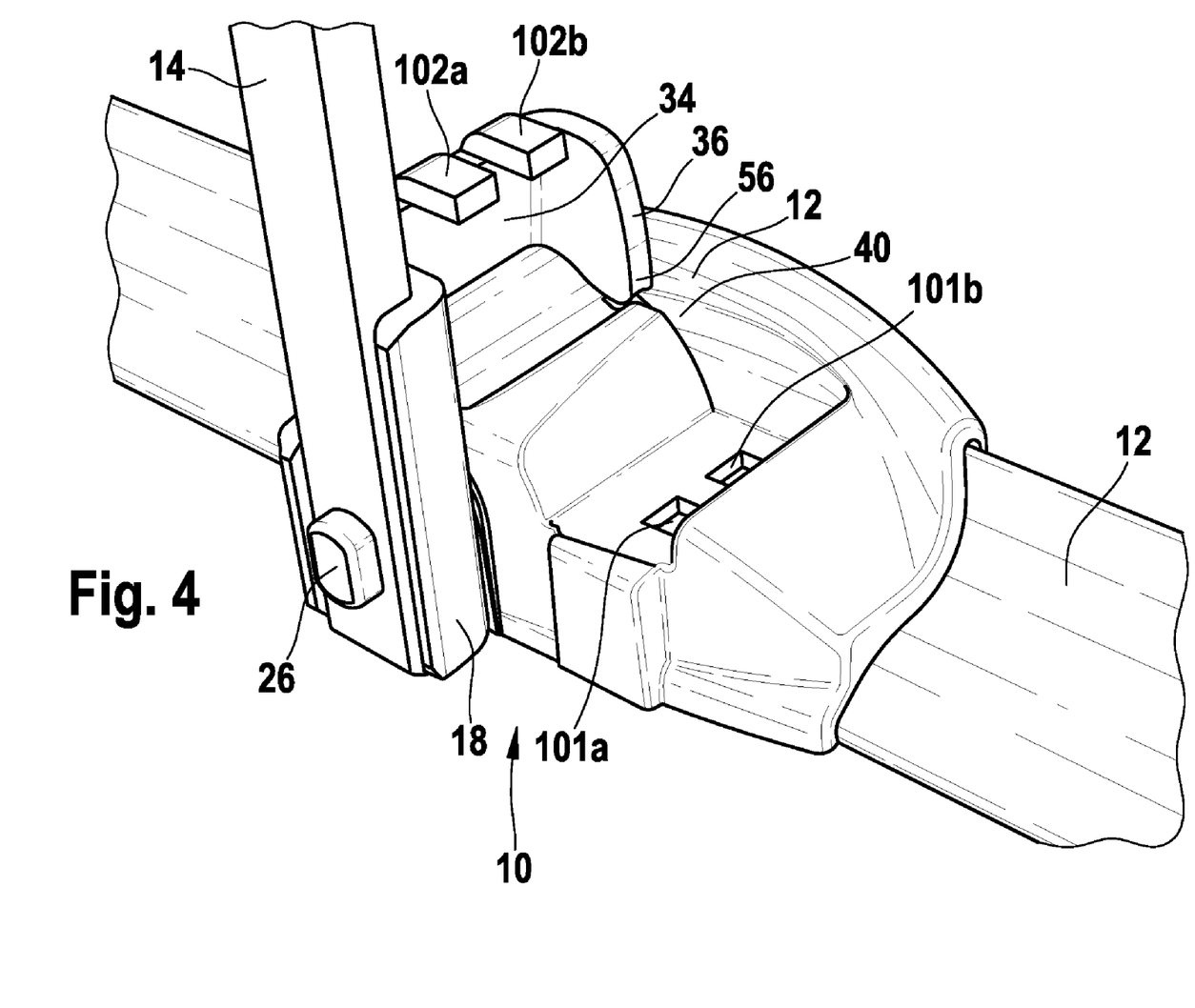
FIG. 4 shows a connection device in which the first identification means are configured as an opening and the corresponding second identification means as a pin.

The following embodiments are at least approximately identical to the basic construction of the connection device 10, so that hereinafter information is substantially only provided about the differences:

In the embodiment shown in FIG. 4, the identification means 102a and 102b of two different wiper arms are shown together on a wiper arm 14 and/or on the corresponding second connection part 18, in order to clarify the variable positioning of the second identification means 102a and 102b on the two different second connection parts 18. As is visible from FIG. 5, it is sufficient to arrange just one single second identification means 102 on a wiper arm 14.

First identification means 101a and 101b corresponding to the second identification means 102a and 102b are present, the two pairs of identification means 101a+102a as well as 101b+102b usually being distributed on two different wiper blades, so that just one wiper blade 12 may be associated with a wiper arm 14. In FIG. 4 the pin 26 is already inserted into the counter hinge element 42 of the first connection part. The wiper arm 14 is at an angle of 90° from the longitudinal extension of the wiper blade 12. If the wiper arm 14 and the wiper blade 12 are rotated relative to one another, the limit stop 36 engages with the shoulder 56 in the recess 40. Moreover, the second identification means 102a configured as a pin and/or the second identification means 102b penetrates the corresponding first identification means 101a and/or 101b. By the engagement of the limit stop 36 in the recess 40, an axial displacement along the rotational axis of the pin 26 is avoided. By varying the length of the shoulder 56 of the limit stop 36, the releasing angle may be varied. In the embodiment shown, the two identification means 102a and 102b are formed on the edge side on the bridge 34 and extend respectively in a plane parallel to a plane receiving the limit stop 36.

Figure 5:
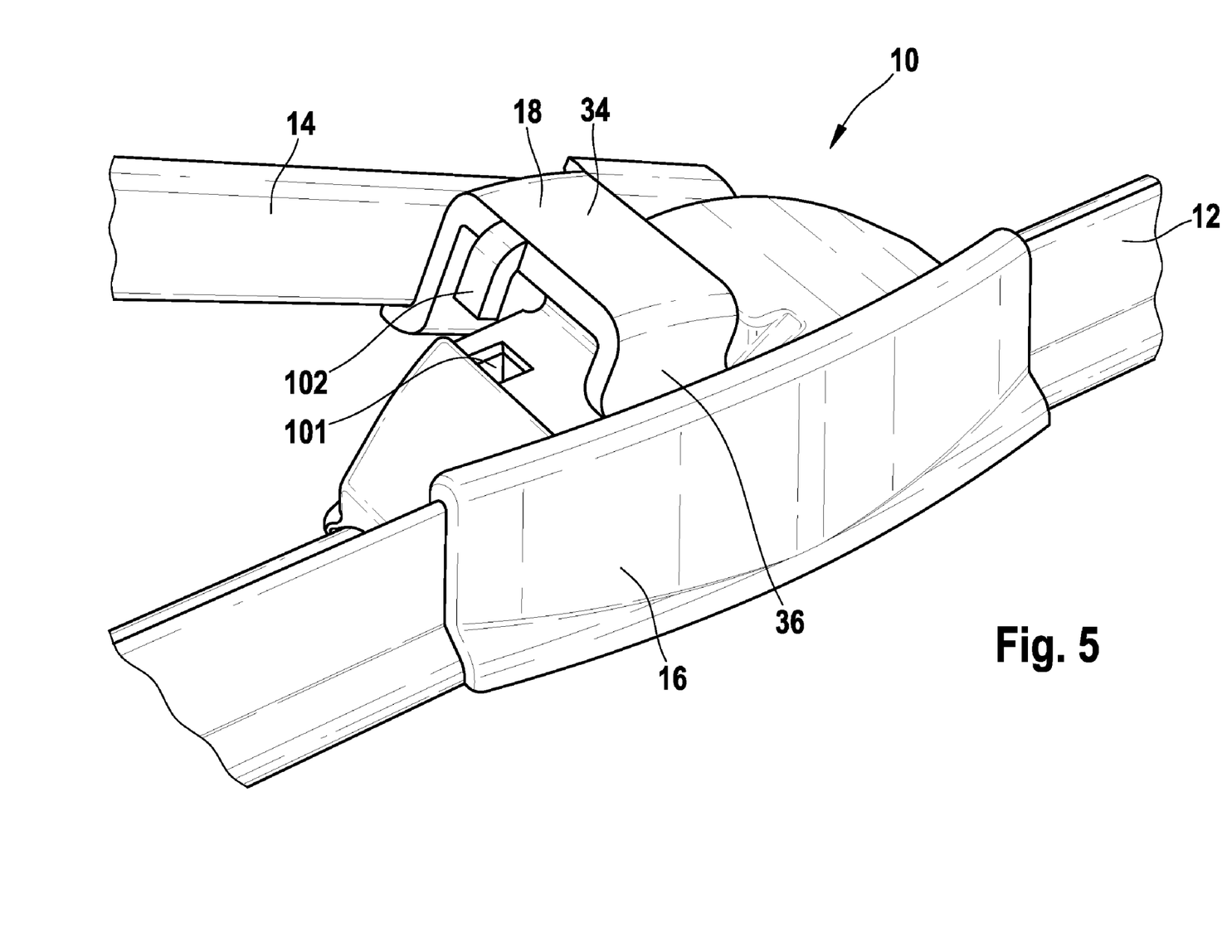
FIG. 5 shows a variant of the connection device according to FIG. 4.

In FIG. 5, the wiper arm 14 and the wiper blade 12 have already been pivoted relative to one another. First identification means 101 and second identification means 102 are about to be engaged. The limit stop 36 already penetrates partially down into the recess 40. Instead of the arrangement of the second identification means 102 configured as a pin, to the side of the bridge 34 an arrangement directly below the bridge 34 is also conceivable.

Figure 6:
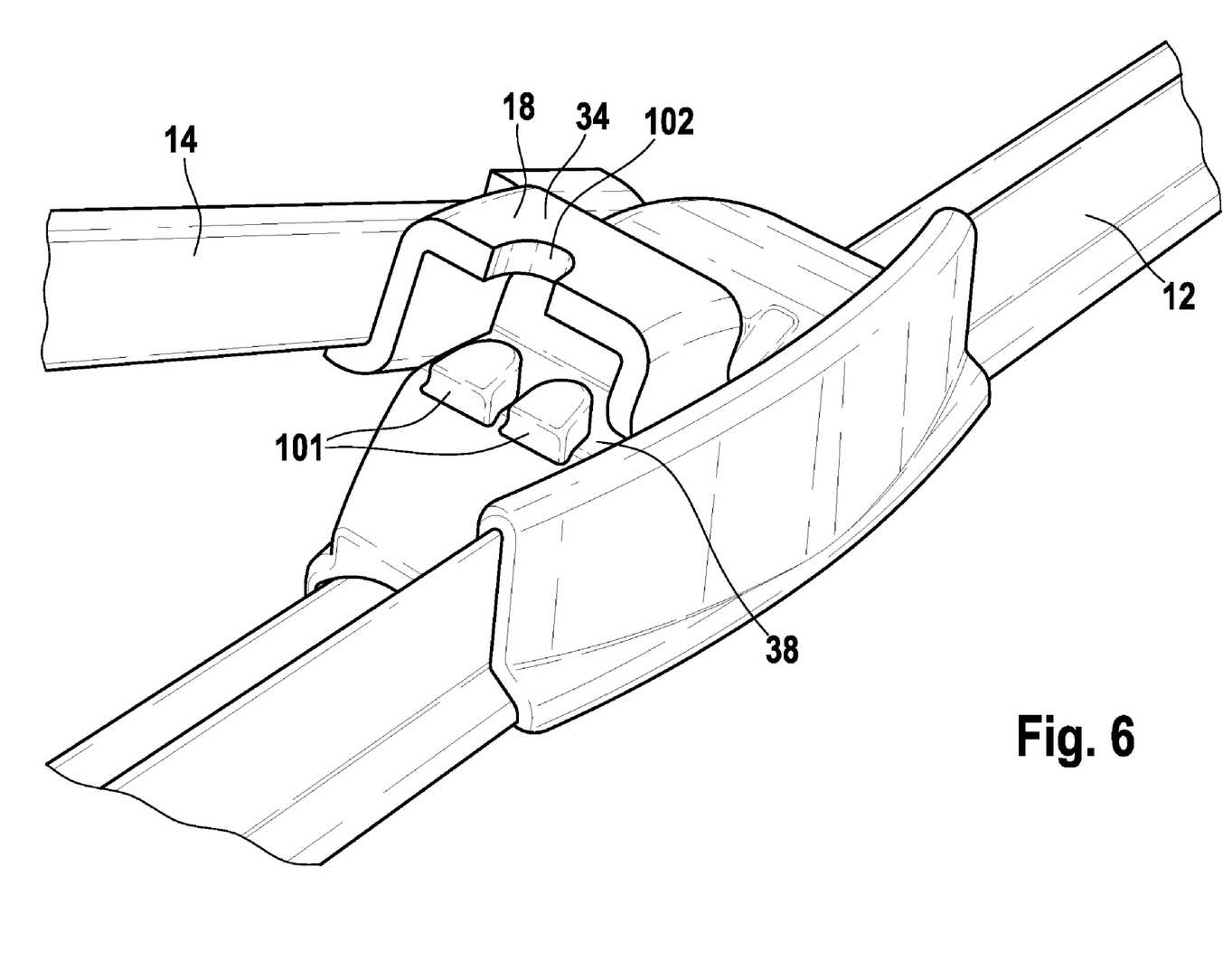
FIG. 6 shows a variant of the connection device in which the first identification means are configured as a pin and the second identification means as an opening.

In the embodiment shown in FIG. 6, the arrangement of the pin and opening relative to the embodiment according to FIG. 5 is transposed. The first identification means 101 are configured as pins arranged adjacent to one another. Said pins are arranged in the region of the receiver 38. In the bridge 34 of the second connection part 18, a recess is incorporated on the edge side corresponding to the first identification means 101, to the left in the drawing plane, which forms the second identification means 102. The wiper arm 14 shown in FIG. 6, does not fit the wiper blade 12 shown, as no further second identification means for receiving the first identification means 101, to the right in the drawing plane, is provided. The wiper arm 14 may not be pivoted into its final operating position. The second connection part 18, not shown, and corresponding to the wiper blade 12 shown, has two first identification means 101 arranged adjacent to one another and configured as recesses. In this manner, a mix-up of the association of the wiper blades 12 between the driver side and the passenger side may be avoided.

Figure 7:
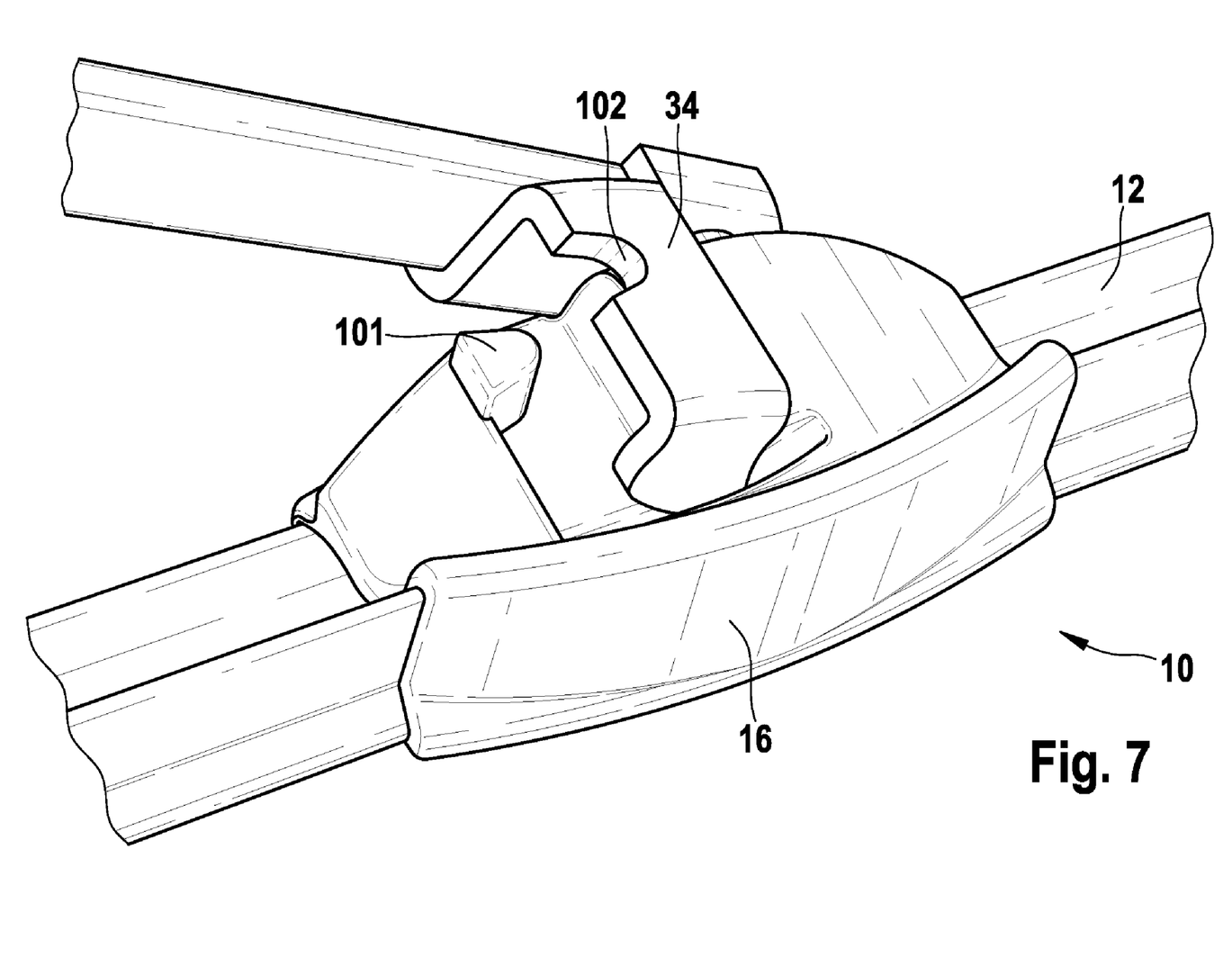
FIG. 7 shows a variant of the connection device according to FIG. 6 during mounting.
Figure 8:
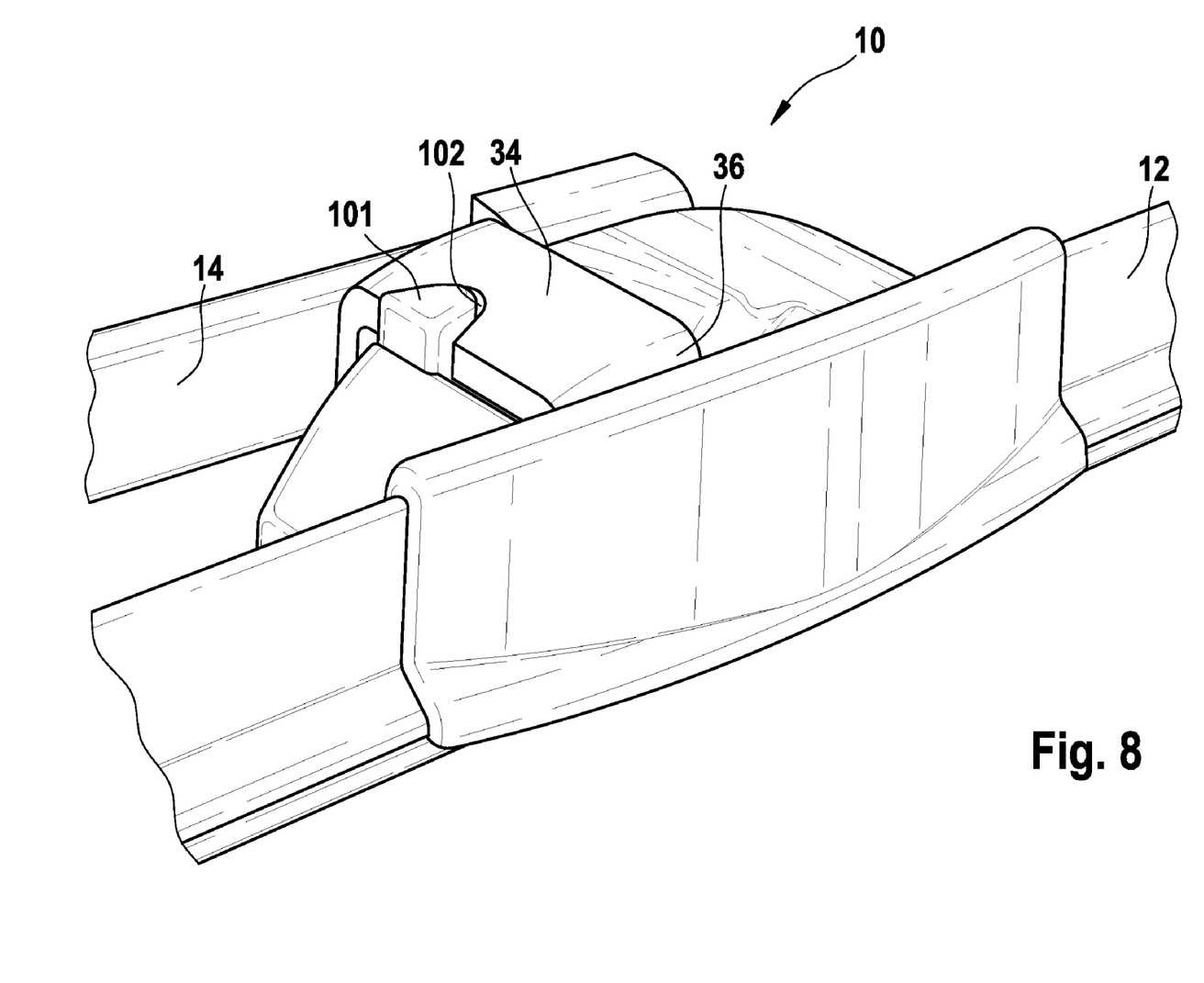
FIG. 8 shows the connection device shown in FIG. 7 in the mounted state.

In the embodiment shown in FIG. 7, a first identification means 101, configured as a pin, is provided on the first connection part 16 of the wiper blade 12. Said pin corresponds to a second identification means 102 configured as a recess on the edge side in the bridge 34. In FIG. 8, the connection device 10 is shown in the mounted state. In this case, the limit stop 36 is entirely received in the recess 40 and the first identification means 101 entirely engages in the second identification means 102 configured as a lateral recess in the bridge 34. The wiper arm 14 extends in the mounted state parallel to the wiper blade 12.

Figure 9:
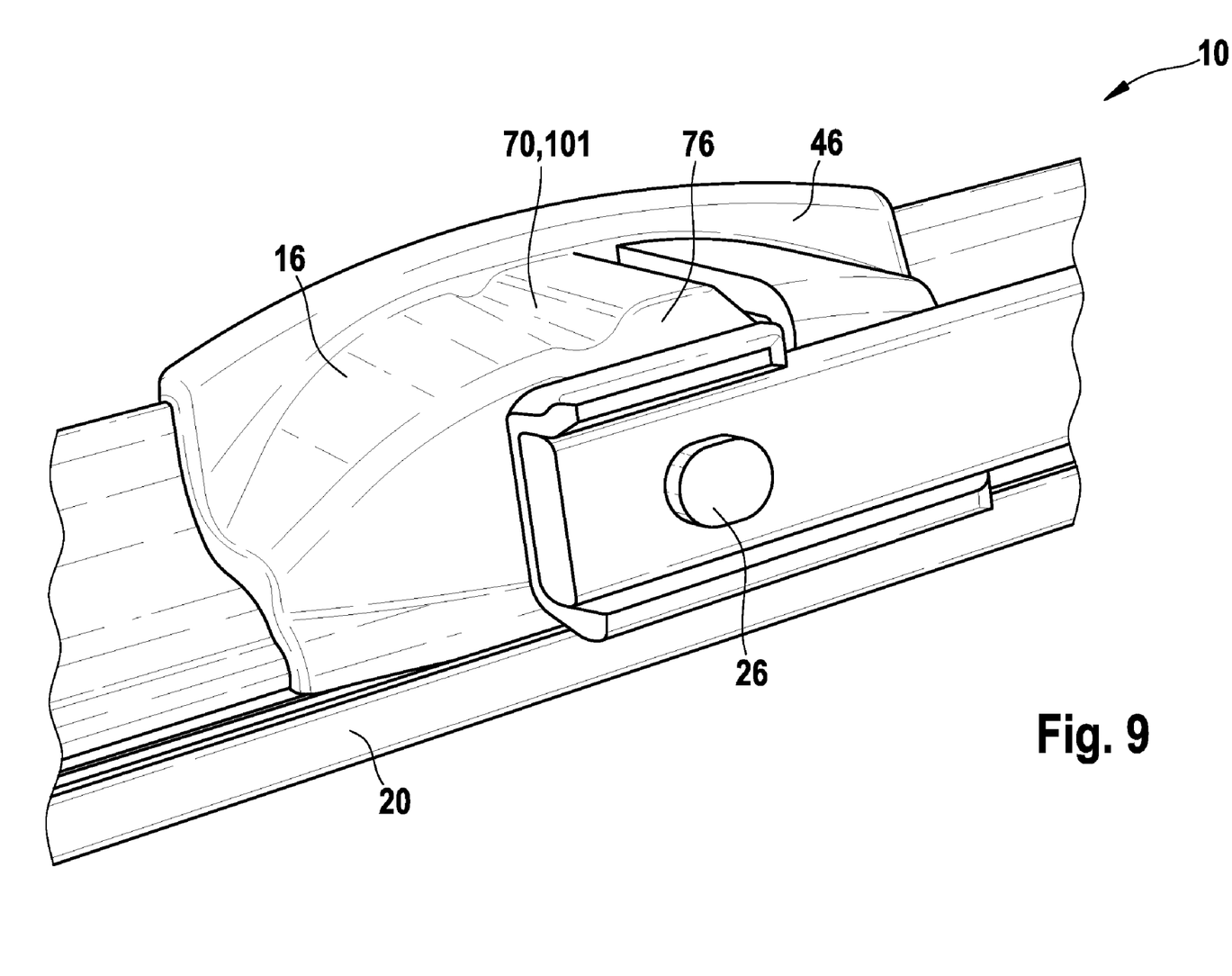
FIG. 9 shows an embodiment in which the upper face of the first connection part forms the first identification means.
Figure 10:
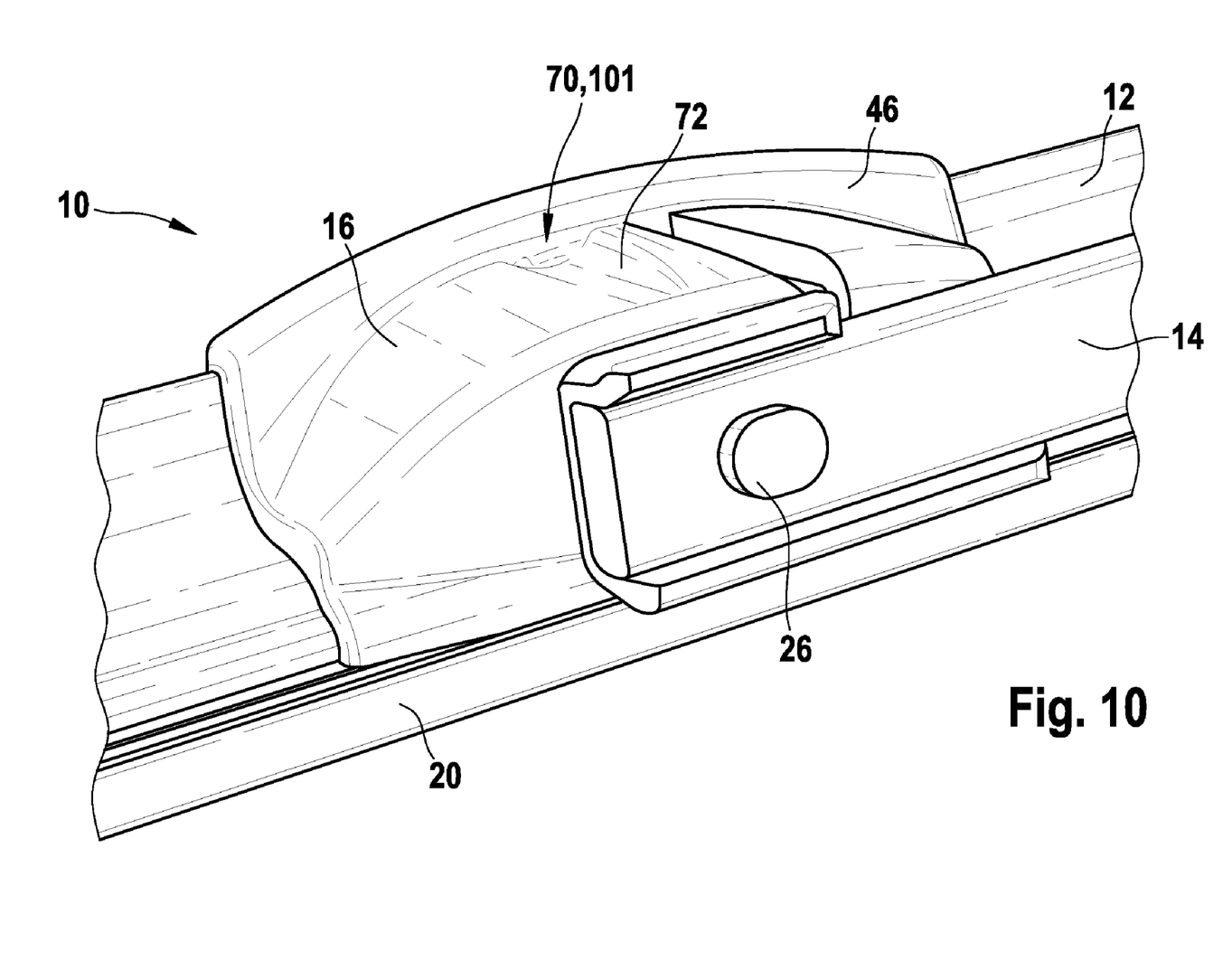
FIG. 10 shows a variant of the connection device according to FIG. 9, with a recess incorporated in the upper face of the second connection part.
Figure 11:
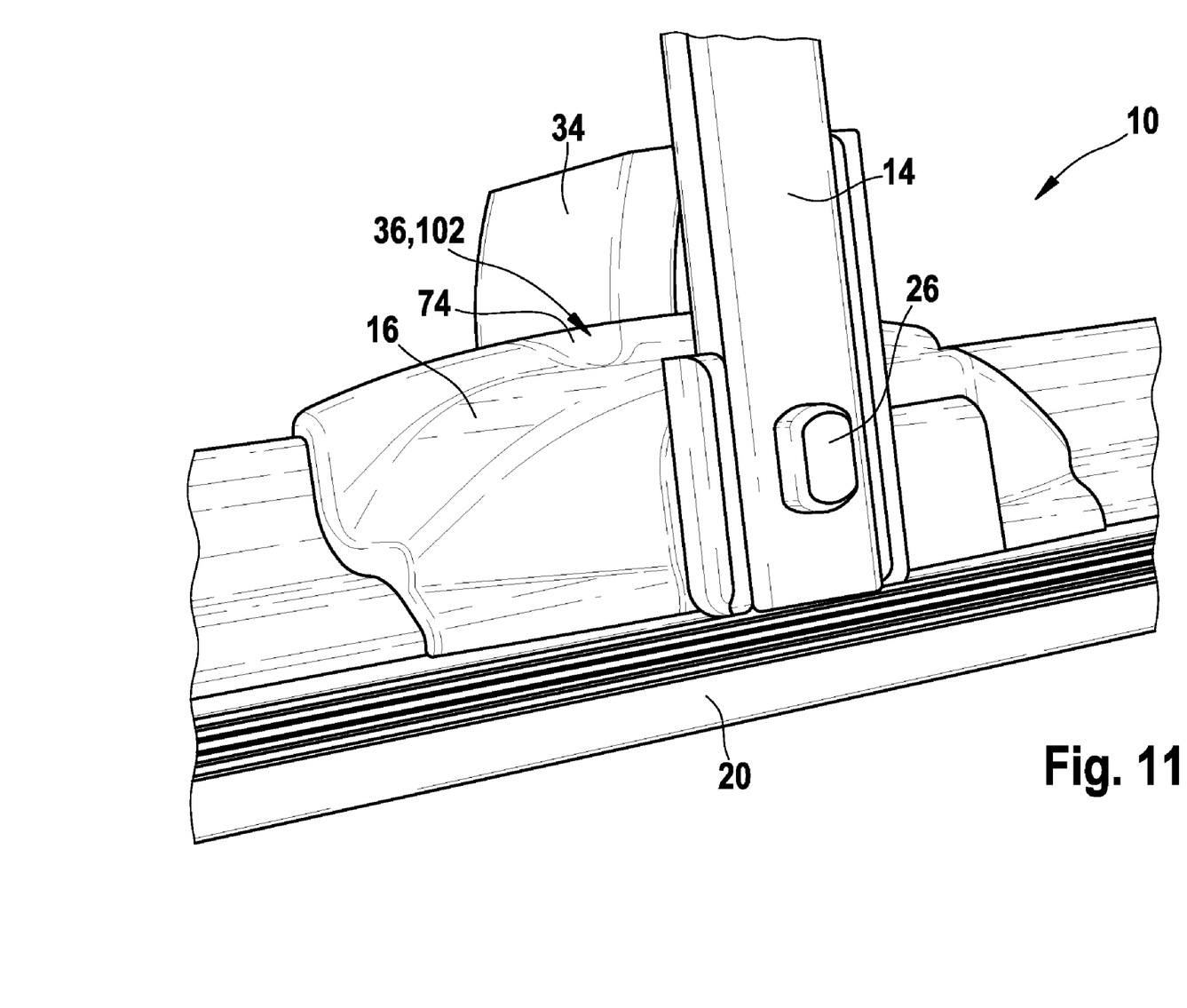
FIG. 11 shows the connection device according to FIG. 10 with corresponding first identification means.

In the embodiment shown in FIGS. 9 to 11, the limit stop 36 and/or the recess thereof serves as second identification means 102. The upper face 70 of the first connection part 16 remote from the wiper blade rubber 20 serves as corresponding first identification means 101. In FIG. 10, a recess 72 is incorporated therein parallel to the rotational axis of the pin 26. As a result of this recess, a portion 74 of the limit stop 36 facing in the direction of the pin 26 is displaced in the direction of a spoiler wall 46 of the first connection part 16 as far as the position shown in FIG. 11, whereupon the wiper blade 12 is pivoted into the position shown in FIG. 10 with the wiper arm 14 arranged parallel to the wiper blade 12. The first connection part 16 shown in FIG. 9 of the connection device 10 has no such recess, so that the projection 74 of the limit stop 36 facing in the direction of the pin, would strike on the side surface 76 of the upper face 70 of the first connection part 16 when attempting to bring together the two connection parts 16, 17. Thus only the identification means 101 and 102 shown in FIGS. 10 and 11 correspond to one another and not the identification means 101 and 102 shown in FIGS. 9 and 11.

Figure 12:
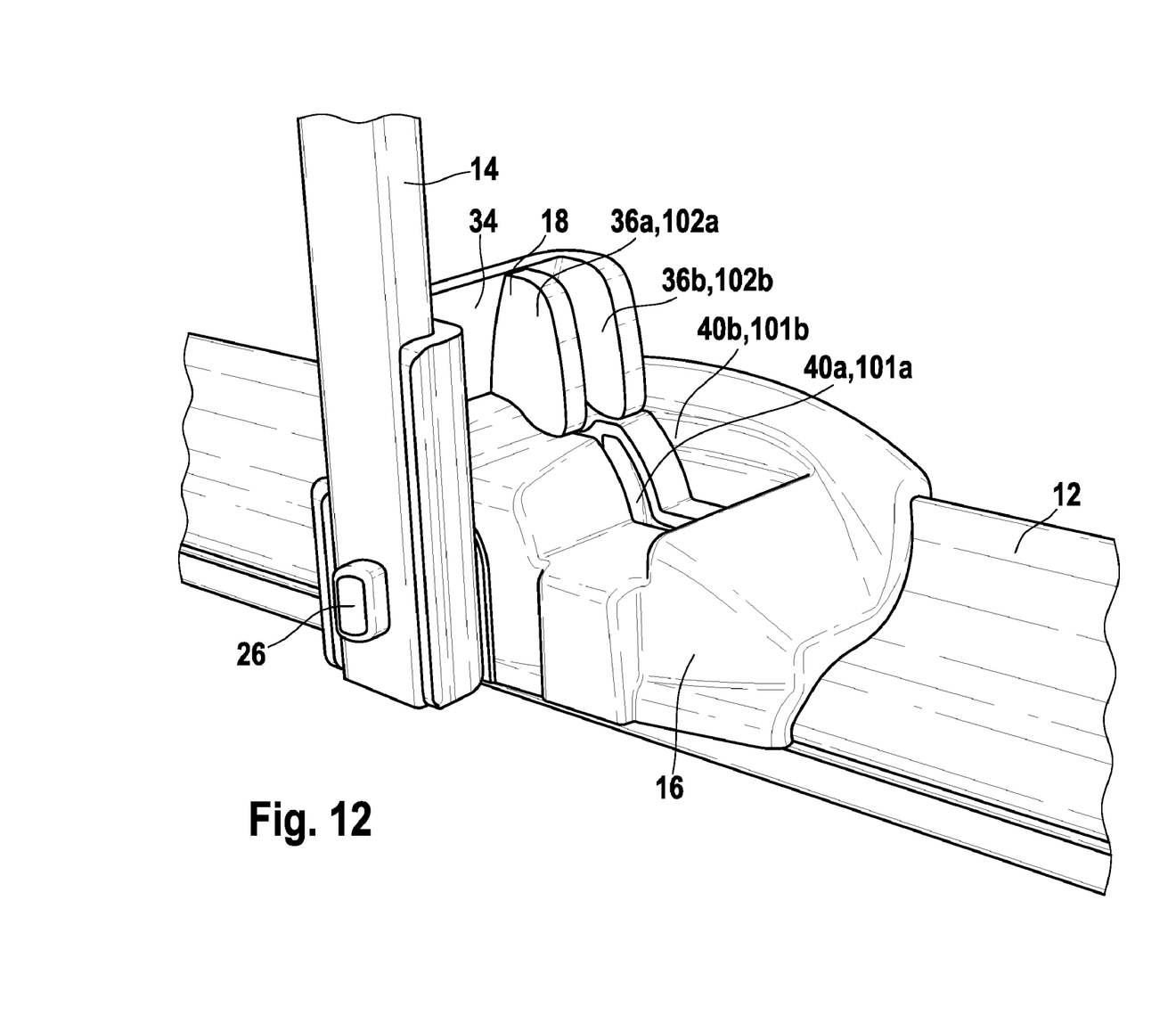
FIG. 12 shows a connection device in a perspective embodiment with identification means configured as a limit stop and recess.

In the embodiment shown in FIG. 12, the limit stop 36 formed on the bridge 34 is used as the second identification means. For clarification of the different position of the second identification means with two different wiper arms, two second identification means 102a and 102b are illustrated in FIG. 12. It is sufficient to provide only one respective second limit stop, i.e. a second identification means 102 on two different wiper arms 14 and/or the second connection parts 18, the limit stops on the different second connection parts 18 either being positioned differently and/or formed differently. The second identification means 102a and 102b correspond to first identification means 101a, 101b which are configured in this embodiment as recesses 40a, 40b for receiving the limit stops 36a, 36b.

Figure 13:
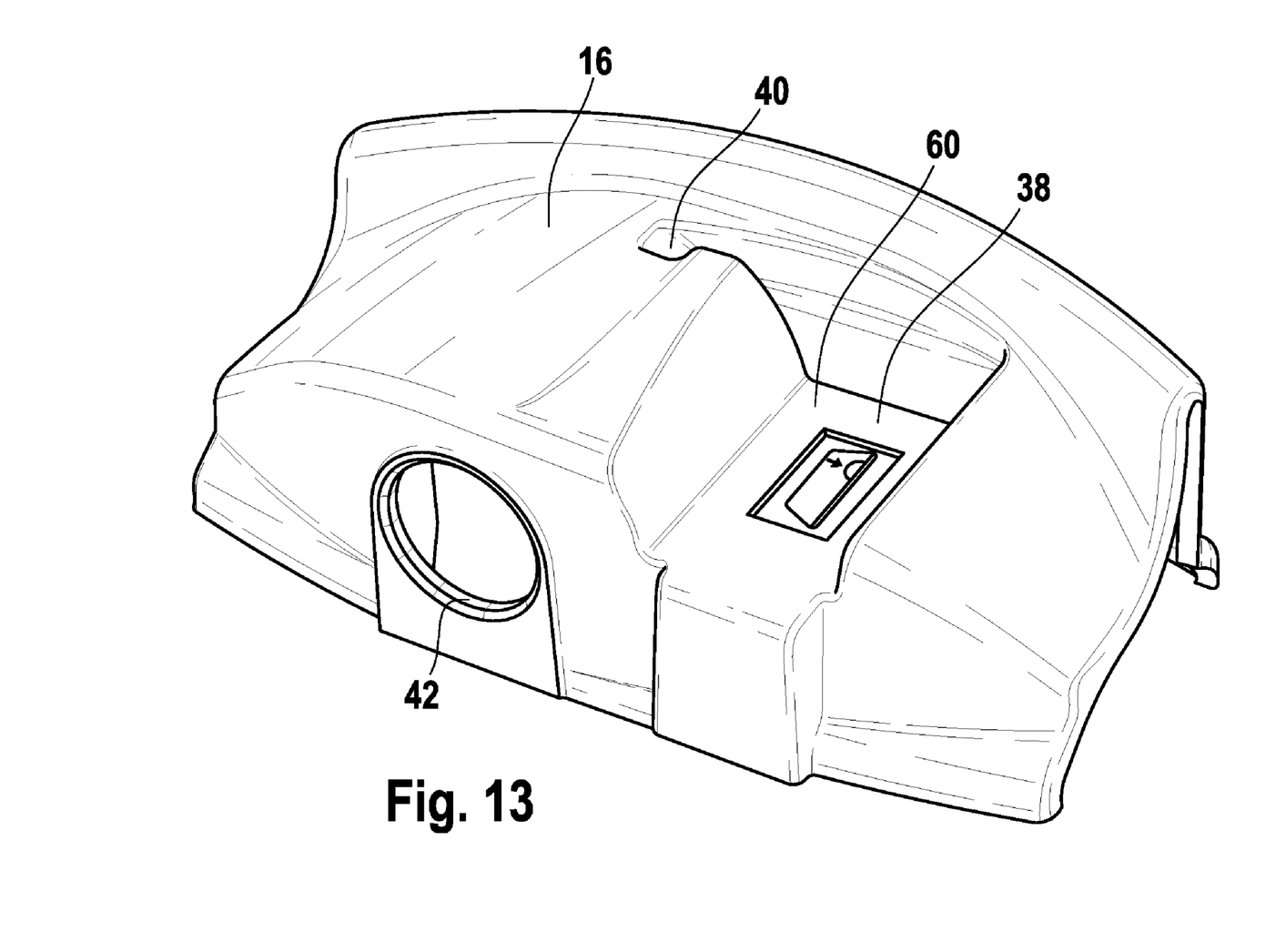
FIG. 13 shows the second connection part of a connection device with the identification logo attached to the base.

In FIG. 13 a first connection part 16 is shown with a recess 38. To the side, the counter hinge element 42 configured as an opening may be seen. In the base 60 of the receiver 38 an identification logo is embossed, which in this case symbolizes the driver side. As a result, the user knows that a wiper blade 12 equipped with said first connection part may only be mounted on the wiper arm on the driver side.

The invention claimed is:

1. In a system comprising two wiper arms, each wiper arm connected to a respective wiper blade by a respective connection device, each connection device comprising a first connection part (16) on a wiper blade side and a second connection part (18) on a wiper arm side, which connection parts are arranged adjacent to one another in the operating position, are pivotably connected via a hinge element about a hinge axis, and at least partially engage in one another by a securing means (32), each first connection part (16) having a receiver (38) for receiving the respective securing means (32), characterized in that the receiver (38) of one wiper blade has a first identification means (101) and the securing means (32) of one wiper arm has a second identification means (102) corresponding to the first identification means (101) in order for mounting the one wiper blade on the one wiper arm, and in that the other wiper blade has a different first identification means, the second identification means (102) on the one wiper arm not corresponding to the different first identification means of the other wiper blade to prevent mounting of the other wiper blade on the one wiper arm.

2. The system as claimed in claim 1, characterized in that the first identification means (101) of the one wiper blade is of complementary shape to the second identification means (102), and in that the different first identification means of the other wiper blade does not have a complementary shape to the second identification means (102).

3. The system as claimed in claim 1, characterized in that the securing means (32) comprises a bridge (34) with a limit stop (36), in that the securing means (32) overlaps at least partially the first connection part (16) by means of the bridge (34), and in that the limit stop (36) is arranged such that in the operating position the first connection part (16) and the second connection part (18) are blocked relative to an axial displacement on the hinge axis.

4. The system as claimed in claim 3, characterized in that the first connection part (16) is at least one of releasable from and connectable to the second connection part (18) by at least one rotation of at least one of the connection parts (16, 18) about the hinge axis by at least one releasing angle of approximately 25 degrees.

5. The system as claimed in claim 3, characterized in that the limit stop (36) is configured as the second identification means (102) and a recess (40) for receiving at least one of the limit stop (36) and the upper face (70) of the first connection part (16) as the first identification means (101).

6. The system as claimed in claim 3, characterized in that the first connection part (16) is at least one of releasable from connectable to the second connection part (18) by at least one rotation of at least one of the connection parts (16, 18) about the hinge axis by at least one releasing angle of between 5 and 50 degrees.

7. The system as claimed in claim 3, characterized in that the first connection part (16) is at least one of releasable from connectable to the second connection part (18) by at least one rotation of at least one of the connection parts (16, 18) about the hinge axis by at least one releasing angle of between 20 and 40 degrees.

8. The system as claimed in claim 3, characterized in that the first connection part (16) is at least one of releasable from connectable to be connected to the second connection part (18) by at least one rotation of at least one of the connection parts (16, 18) about the hinge axis by at least one releasing angle of between 20 and 30 degrees.

9. The system as claimed in claim 1, characterized in that the first identification means (101) of the one wiper is configured as an opening and the second identification means (102) is configured as a pin which engage one another in the operating position.

10. The system as claimed in claim 1, characterized in that the identification means (101, 102) are arranged eccentrically along a longitudinal extension of the securing means (32).

11. The system as claimed in claim 1, characterized in that the first identification means of the other wiper blade corresponds to a second identification means of the other wiper arm of the vehicle, the second identification means of the other wiper arm being different that the second identification means of the one wiper arm.

12. The system as claimed in claim 11, characterized in that the first identification means of the one wiper blade does not correspond to the second identification means of the other wiper arm.

13. A system for a vehicle comprising two flat-bar wiper blades comprising one first connection part (16) for fastening one flat-bar wiper blade (12) to one wiper arm (14) and another first connection part (16) for fastening another flat-bar wiper blade (12) to another wiper arm (14), each first connection part (16) comprising a counter hinge element (42), so that each flat-bar wiper blade (12) is pivotably connected about a hinge axis to the corresponding wiper arm (14), and each first connection part (16) comprising one receiver (38) for receiving a securing means (32) of a second connection part (18) of the corresponding wiper arm (14), characterized in that on each receiver (38), at least one first identification means (101) is provided for differentiating the two wiper blades (12), in that the first identification means of the one wiper blade corresponds to a second identification means of the one wiper arm in order for mounting the one arm on the one wiper blade, and in that the first identification means of the one wiper blade does not correspond to the second identification means of the other wiper arm to prevent mounting of the other wiper arm on the one wiper blade.

14. The system as claimed in claim 13, characterized in that the first identification means (101) is configured as a pin or opening.

15. The system as claimed in claim 13, characterized in that at least one of a pin and an opening is arranged on each flat wiper blade as first identification means (101), and in that at least one of the pins and the openings are at least one of differently formed, positioned and present in different numbers to differentiate the two wiper blades (12).

16. The system as claimed in claim 13, characterized in that the first identification means (101) are configured as recesses (40) for receiving respectively at least one limit stop (36) of the securing means (32), the recesses (40) of the two flat-bar wiper blades (12) being at least one of differently formed and positioned.

17. The system as claimed in claim 13, characterized in that the first identification means (101) is configured as an identification logo (78) preferably arranged on the base (60) of the receiver (38).

18. The system as claimed in claim 13, characterized in that the first identification means of the other wiper blade corresponds to a second identification means of the other wiper arm, the second identification means of the other wiper arm being different that the second identification means of the one wiper arm.

19. The system as claimed in claim 18, characterized in that the first identification means of the other wiper blade does not correspond to the second identification means of the one wiper arm.

20. The system as claimed in claim 13, characterized in that the one wiper blade is a driver side wiper blade and the one wiper arm is a driver side wiper arm, and in that the other wiper blade is a passenger side wiper blade and the other wiper arm is a passenger side wiper arm.

\* \* \* \* \*